US010119858B2

(12) United States Patent
Gupta et al.

(10) Patent No.: US 10,119,858 B2
(45) Date of Patent: Nov. 6, 2018

(54) LENS FOR PET REJECTING PASSIVE INFRARED SENSOR

(71) Applicant: Google LLC, Mountain View, CA (US)

(72) Inventors: Anurag Gupta, San Jose, CA (US); Aveek Ravishekhar Purohit, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/900,221

(22) Filed: Feb. 20, 2018

(65) Prior Publication Data

US 2018/0172505 A1    Jun. 21, 2018

Related U.S. Application Data

(63) Continuation of application No. 15/352,317, filed on Nov. 15, 2016, now Pat. No. 9,933,296, which is a
(Continued)

(51) Int. Cl.
*G01J 1/04* (2006.01)
*G01J 1/02* (2006.01)
(Continued)

(52) U.S. Cl.
CPC ............ *G01J 1/0411* (2013.01); *G01J 1/0266* (2013.01); *G01J 1/44* (2013.01); *G02B 3/0006* (2013.01); *G02B 3/08* (2013.01); *G08B 13/193* (2013.01)

(58) Field of Classification Search
CPC ...... G01J 5/0025; G01J 5/0022; G01J 5/0411; G01J 5/0266; G01J 5/44; G02B 3/0006; G02B 3/08
(Continued)

(56) References Cited

U.S. PATENT DOCUMENTS 4,849,635 A * 7/1989 Sugimoto ............... G08B 13/19
250/342
4,868,391 A * 9/1989 Messiou ............... G02B 3/0037
250/342
(Continued)

FOREIGN PATENT DOCUMENTS

| GB | 2332955 A | 7/1999 |
| GB | 2475650 A | 5/2011 |
| GB | 2507818 A | 5/2014 |

OTHER PUBLICATIONS

"Invitation to Pay Additional Fees and, Where Applicable, Protest Fee", Mar. 17, 2016, p. 7.
(Continued)

*Primary Examiner* — David Porta
*Assistant Examiner* — Blake Riddick
(74) *Attorney, Agent, or Firm* — Morris & Kamlay LLP (57) ABSTRACT

A passive infrared motion detection sensor that includes a Fresnel focusing arrangement that creates at least a first infrared sensing region, a second infrared sensing region, and a third infrared sensing region, in which target detection in one or more infrared sensing regions is weighted to be distinguishable from target detection in remaining infrared sensing regions. The Fresnel focusing arrangement creates the weighted infrared sensing regions using a lenslet region, an optically opaque region and a plurality of extruded cylindrical lenslets that extend across a portion of both the lenslet region and the optically opaque region. The signal detection in at least the second weighted infrared sensing region, for example, an infrared sensing range between 6 and 10 feet, is weighted to easily distinguish between a pet within the second infrared sensing range and a person at any infrared sensing range.

16 Claims, 6 Drawing Sheets

Related U.S. Application Data continuation of application No. 14/586,326, filed on Dec. 30, 2014, now Pat. No. 9,500,517.

(51) Int. Cl.
*G01J 1/44* (2006.01)
*G02B 3/00* (2006.01)
*G02B 3/08* (2006.01)
*G08B 13/19* (2006.01)
*G08B 13/193* (2006.01)

(58) Field of Classification Search
USPC .................................. 250/DIG. 1, 342, 340
See application file for complete search history.

(56) References Cited

U.S. PATENT DOCUMENTS

| | | | |
|---|---|---|---|
| 5,473,311 A | 12/1995 | Hoseit | |
| 5,670,943 A | 9/1997 | DiPoala et al. | |
| 5,923,250 A | 7/1999 | Pildner et al. | |
| 6,211,522 B1 | 4/2001 | Kotlicki et al. | |
| 6,215,399 B1 | 4/2001 | Shpater | |
| 6,265,972 B1 | 7/2001 | Lee | |
| 9,116,037 B2 | 8/2015 | Claytor | |
| 2004/0135688 A1 | 7/2004 | Zhevelev et al. | |
| 2005/0231353 A1* | 10/2005 | DiPoala | G08B 13/2494 340/522 |
| 2007/0007439 A1* | 1/2007 | Nuebling | F21V 5/04 250/216 |
| 2007/0076306 A1 | 4/2007 | Lerner et al. | |
| 2007/0081254 A1 | 4/2007 | Endle et al. | |
| 2011/0155911 A1 | 6/2011 | Claytor | |
| 2013/0006899 A1 | 1/2013 | Cook | |
| 2015/0233702 A1 | 8/2015 | Micko | |
| 2015/0233765 A1 | 8/2015 | Micko | |
| 2015/0346023 A1 | 12/2015 | Herrera Stromberg | |
| 2016/0033333 A1 | 2/2016 | Claytor | |

OTHER PUBLICATIONS

International Search Report and Written Opinion dated May 24, 2016 as received in Application No. PCT/US2015/066485.

IPRP dated Jul. 13, 2017 as received in Application No. PCT/US2015/066485.

* cited by examiner

LENS FOR PET REJECTING PASSIVE INFRARED SENSOR

BACKGROUND

Passive infrared detectors focus radiation from an area to be monitored such that the presence and movement of a human, pet or similar object through a monitored space can be detected and preferably distinguished as such. In most systems, a Fresnel focusing arrangement, including any arrangement of lens or mirrors, is used to focus the infrared radiation emitted by the target onto a passive infrared detector for further processing.

To improve the response characteristics of the sensor, the Fresnel focusing arrangement can include any number of features such as multiple lenslets, in which each lenslet includes a focusing element to define an infrared beam that collectively covers a protected area or section thereof. The width of the infrared beams typically increase in size as an increasing function that is proportional to the distance from the sensor. This characteristic of the Fresnel focusing arrangement may make it difficult to distinguish between small pets located in a region close to the sensor, from a human located at a substantial distance from the sensor. For example, at distances closer to the sensor, the width of the infrared beams are narrow and as such, a small pet will produce a signal similar in level to a person detected at a substantial distance away from the sensor.

To address such problems, some systems have attempted to alter the collection features of the sensor. For example, some systems incorporate a Fresnel focusing arrangement that excludes the signals generated by small pets located in a region close to the sensor. The Fresnel focusing arrangement in this case can include a dead or reduced-capacity bottom zone for the sensor region closest to the sensor in order to shield signals from pets at this distance and thereby reduce false alarms caused by such pets. However, this fails to substantially address the problems created when tall or vertically mobile pets and typography allow pets to easily enter other, non-shielded zones.

Alternatively, a single passive infrared detector sensor may be used that includes a number of gaps between the sensing beams or zones. These sensing beams or zones are spaced such that a small pet must enter a dead zone associated with the gaps as they move across the space. In contrast, a person is a much larger and taller object and will therefore, produce a signal regardless whether he is standing at a position which at floor lever, is in a dead zone. With this arrangement, a pet produces a pulse signal with a very low component when the pet is in the dead zone, whereas a person, although producing a pulsed signal, produces a signal which is much more constant and can be easily distinguished from a pet. However, this also fails to substantially address the problems created when vertically mobile pets and topology allow pets to easily enter high areas in close proximity to the sensor which can bridge two active zones much in the manner as a person.

In yet another attempt to address such problems, two different types of sensors can be used to help distinguish between a person and pet. For example, these systems can include a microwave sensor in combination with a passive infrared sensor. However, this type of dual technology sensor greatly increases the cost and complexity of the system. In yet another similar attempt to address such problems, a two-element, passive infrared detector can be used to help distinguish between a human and pet. The system can receive and process the signals from the two detectors to help distinguish between a person and pet. Typically one element is provided to detect radiation signals at lower or closer sensing ranges, and a second detector is provided to detect radiation signals at higher or further sensing ranges. A pet does not have the height to trigger both detectors. However, this also fails to substantially address the problems created when tall or vertically mobile pets and typography allow pets to easily enter high areas in close proximity to the sensor and as with other two sensor systems, the additional sensors greatly increases the cost and complexity of the system.

BRIEF SUMMARY

According to embodiments of the disclosed subject matter, a system and method is provided to substantially address the problems associated with the prior art and having low cost and complexity while maintaining a high level of reliability.

According to an embodiment of the disclosed subject matter, means for a passive infrared motion detection sensor which has improved features with respect to detection and distinction between persons and pets during pet immune mode operations are provided.

To do so, an embodiment of the disclosed subject matter provides a passive infrared motion detection sensor that enables pet immunity in which the maximum signal of a pet at a range of interest, is exceeded by the minimum signal of a person at any range, taking into consideration the range and height of sensing distances and the fact that the size of the active area from which radiation is focused increases as a function of the separation distance from the sensor.

An embodiment of the disclosed subject matter provides a passive infrared motion detection sensor that enables pet immunity by creating and using "weighted regions" that include at least three discrete regions with different infrared light gathering strengths to improve features with respect to detection and distinction between persons and pets during pet immune mode operations. A substantially opaque region and a lenslet region are provided, and a cross-over region is provided there between to target the infrared sensing distances of between 0 and 10 feet and specifically the infrared sensing distances of between 6 and 10 feet, in which a sensed image of a pet can be easily confused with an image of a person at the same or greater sensing distance.

The embodiment of the disclosed subject matter provides a passive infrared motion detection sensor that includes a Fresnel focusing arrangement that creates at least a first weighted infrared sensing region, a second weighted infrared sensing region, and a third weighted infrared sensing region, in which the first weighted region corresponds to infrared sensing ranges between 10 and 20 feet, the second weighted region corresponds to infrared sensing ranges between 6 and 10 feet, and the third weighted region corresponds to infrared sensing ranges between 0 and 6 feet, but embodiments are not limited thereto. The Fresnel focusing arrangement creates the weighted infrared sensing regions using a lenslet region, an optically opaque region and a plurality of extruded cylindrical lenslets that extend across a portion of both the lenslet region and the optically opaque region, in which signal detection in the infrared sensing ranges between 6 and 10 feet is weighted relative to other signal detection to easily distinguish between a pet within the second infrared sensing range and a person at any infrared sensing range.

Another aspect of the invention involves a passive infrared motion detection sensor that includes a means for creating at least a first weighted infrared sensing region; a means for creating a second weighted infrared sensing region; and means for creating a third weighted infrared sensing region, in which the first weighted region corresponds to infrared sensing ranges between 10 and 20 feet, the second weighted region corresponds to infrared sensing ranges between 6 and 10 feet, and the third weighted region corresponds to infrared sensing ranges between 0 and 6 feet. Signal detection in the infrared sensing ranges between 6 and 10 feet is weighted relative to other signal detection to easily distinguish between a pet within the second infrared sensing range and a person at any infrared sensing range.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Implementations of the disclosed subject matter can enable pet immunity by creating weighted regions in the view of a sensor in which the maximum signal of a pet at a given range is exceeded by the minimum signal of a person at any range. This can establish a minimum threshold below which a detected object can be presumed to be a pet and above which it can be presumed to be a person, at all ranges.

Embodiments disclosed herein may use one or more sensors. In general, a "sensor" may refer to any device that can obtain information about its environment. Sensors may be described by the type of information they collect. For example, sensor types as disclosed herein may include motion, smoke, carbon monoxide, proximity, temperature, time, physical orientation, acceleration, location, entry, presence, pressure, light, sound, and the like. A sensor also may be described in terms of the particular physical device that obtains the environmental information. For example, an accelerometer may obtain acceleration information, and thus may be used as a general motion sensor and/or an acceleration sensor. A sensor also may be described in terms of the specific hardware components used to implement the sensor. For example, a temperature sensor may include a thermistor, thermocouple, resistance temperature detector, integrated circuit temperature detector, or combinations thereof. A sensor also may be described in terms of a function or functions the sensor performs within an integrated sensor network, such as a smart home environment as disclosed herein. For example, a sensor may operate as a security sensor when it is used to determine security events such as unauthorized entry. A sensor may operate with different functions at different times, such as where a motion sensor is used to control lighting in a smart home environment when an authorized user is present, and is used to alert to unauthorized or unexpected movement when no authorized user is present, or when an alarm system is in an "armed" state, or the like. In some cases, a sensor may operate as multiple sensor types sequentially or concurrently, such as where a temperature sensor is used to detect a change in temperature, as well as the presence of a person or animal. A sensor also may operate in different modes at the same or different times. For example, a sensor may be configured to operate in one mode during the day and another mode at night. As another example, a sensor may operate in different modes based upon a state of a home security system or a smart home environment, or as otherwise directed by such a system.

In general, a "sensor" as disclosed herein may include multiple sensors or sub-sensors, such as where a position sensor includes both a global positioning sensor (GPS) as well as a wireless network sensor, which provides data that can be correlated with known wireless networks to obtain location information. Multiple sensors may be arranged in a single physical housing, such as where a single device includes movement, temperature, magnetic, and/or other sensors. Such a housing also may be referred to as a sensor or a sensor device. For clarity, sensors are described with respect to the particular functions they perform and/or the particular physical hardware used, when such specification is necessary for understanding of the embodiments disclosed herein.

Figure 1:
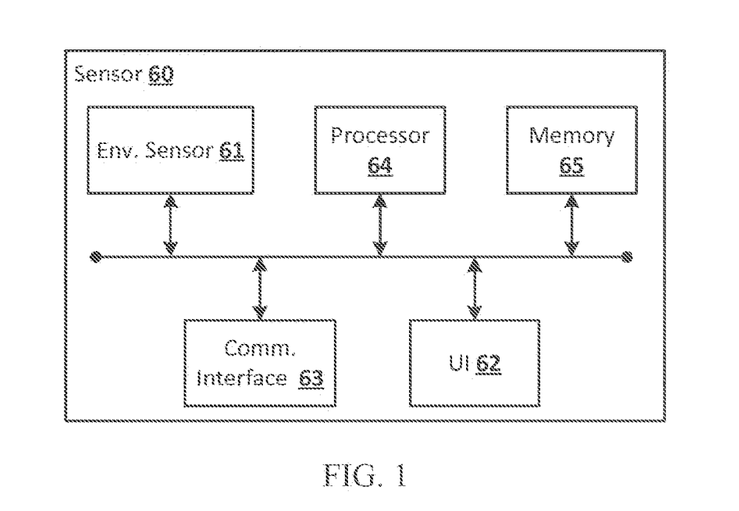
FIG. 1 shows a sensor for incorporating a Fresnel focusing arrangement of FIG. 2 according to an embodiment of the disclosed subject matter.

A sensor may include hardware in addition to the specific physical sensor that obtains information about the environment. FIG. 1 shows an example sensor as disclosed herein. The sensor 60 may include an environmental sensor 61, such as a passive infrared (PIR) sensor or any other suitable environmental sensor that obtains a corresponding type of information about the environment in which the sensor 60 is located. A processor 64 may receive and analyze data obtained by the sensor 61, control operation of other components of the sensor 60, and process communication between the sensor and other devices. The processor 64 may execute instructions stored on a computer-readable memory 65. The memory 65 or another memory in the sensor 60 may also store environmental data obtained by the sensor 61. A communication interface 63, such as a Wi-Fi or other wireless interface, Ethernet or other local network interface, or the like may allow for communication by the sensor 60 with other devices.

A user interface (UI) 62 may provide information and/or receive input from a user of the sensor. The UI 62 may include, for example, a speaker to output an audible alarm when an event is detected by the sensor 60. Alternatively, or in addition, the UI 62 may include a light to be activated when an event is detected by the sensor 60. The user interface may be relatively minimal, such as a limited-output display, or it may be a full-featured interface such as a touchscreen. Components within the sensor 60 may transmit and receive information to and from one another via an internal bus or other mechanism as will be readily understood by one of skill in the art. One or more components may be implemented in a single physical arrangement, such as where multiple components are implemented on a single integrated circuit. Sensors as disclosed herein may include other components, and/or may not include all of the illustrative components shown.

Figure 2:
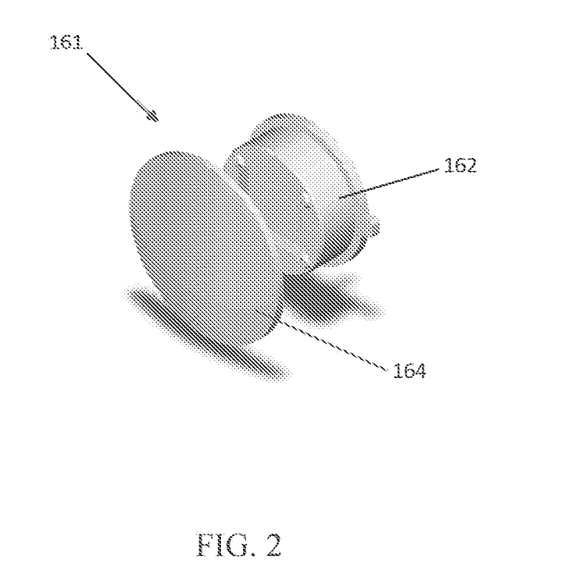
FIG. 2 shows a passive infrared motion detection sensor according to an embodiment of the disclosed subject matter.

As a specific example, the sensor 60 may include as an environmental sensor 61, a passive infrared (PIR) sensor that obtains a corresponding type of information about the environment in which the sensor 60 is located. An illustrative passive infrared motion detection sensor 161 is shown in FIG. 2 and includes improved features with respect to detection and distinction between persons and pets during pet immune mode operations. The sensor 161 includes at least an infrared detector 162 and a Fresnel focusing arrangement 164. The Fresnel focusing arrangement 164 may be configured to gather and focus infrared light from a target environment onto the infrared detector 162 for processing into a far field relative intensity pattern. Additional structure and components of the infrared detector 162 are omitted for clarity. Further, the quantity and arrangement of the components in FIG. 2 are for illustration purposes only, and embodiments as disclosed herein are not limited thereto.

The Fresnel focusing arrangement 164 focuses the infrared radiation from the space being monitored onto the infrared detector 162, and the signal from the infrared detector 162 is processed to determine the strength of the signal received at any point in time and based thereon, determine and distinguish the source of the received signal. The signal that is generated by a pet is normally significantly lower in amplitude than the signal that is generated by a person and can be screened by an appropriate algorithm. Unfortunately, as noted in the background section, Fresnel lens arrangements used in prior art passive infrared motion sensors have the characteristic that the size of the active area from which radiation is focused increases as a function of the separation distance from the detector. Therefore, it becomes more and more difficult to distinguish between the signal of a pet at a closer distance, from the signal of a person at a greater distance. At distances closer to the sensor, the width of the infrared beams are narrow and as such, a small pet will produce a signal similar in level to a person detected at a substantial distance away from the sensor. Such sensors do not distinguish a distance or height of an object, and typically operate based upon simple signal comparisons with threshold limits to identify targets.

Therefore, to detect and distinguish a pet it may be beneficial to use a system and method in which the maximum signal of a pet at a range of interest, is exceeded by the minimum signal of a person at any range, taking into consideration the range and height of sensing distances and the fact that the size of the active area from which radiation is focused increases as a function of the separation distance from the sensor. The following embodiment of the disclosed subject matter provides a passive infrared motion detection sensor 161 that enables pet immunity by creating and using "weighted regions" that include at least three discrete regions with different infrared light gathering strengths to improve features with respect to detection and distinction between persons and pets during pet immune mode operation. Such features can be enabled in a pet immune operation mode, and otherwise disregarded where no pets are present. That is, the system can provide at least two modes of operation. Where no pets are expected to be present within a detection range of the sensor, the user can operate the system without the creation and use of the weighted regions of the pet immune operation mode. Where pets are expected to be present within a detection range of the sensor, the user can operate the same system to implement the pet immune operation mode as described in greater detail below.

The embodiment of the disclosed subject matter provides a passive infrared motion detection sensor 161 that includes a Fresnel focusing arrangement 164 that creates a first weighted region, a second weighted region, and a third weighted region at different sensing ranges. For example, a first weighted region may correspond to infrared sensing ranges between 10 and 20 feet, a second weighted region may correspond to infrared sensing ranges between 6 and 10 feet, and a third weighted region may correspond to infrared sensing ranges between 0 and 6 feet, but embodiments are not limited thereto. The Fresnel focusing arrangement 164, shown in greater detail in FIG. 3A, creates the weighted infrared sensing regions using a lenslet region, an optically opaque region and a plurality of extruded cylindrical lenslets that extend across a portion of both the lenslet region and the optically opaque region. In such a configuration, signal detection in the infrared sensing ranges between 0 and 10 feet and specifically between 6 and 10 feet may be weighted to easily distinguish between a pet within the second infrared sensing range and a person at any infrared sensing range.

Figure 3A:
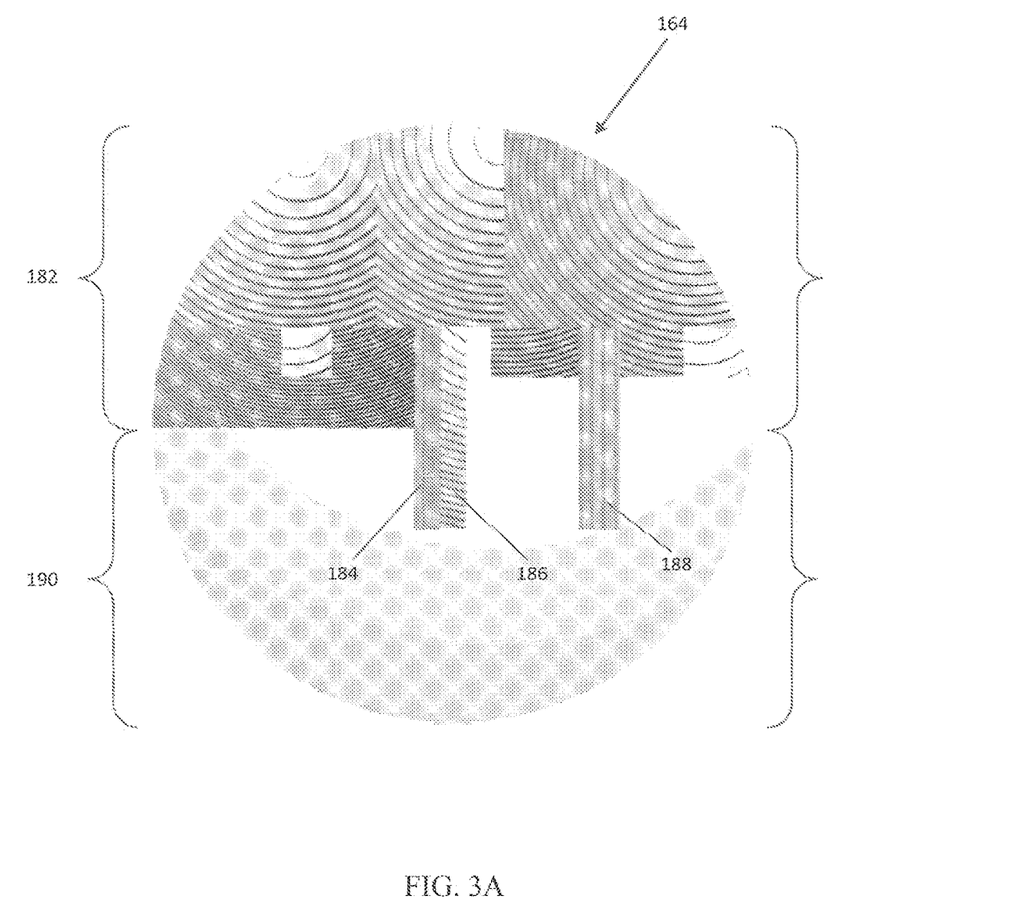
FIG. 3A shows a Fresnel focusing arrangement according to an embodiment of the disclosed subject matter.
Figure 4:
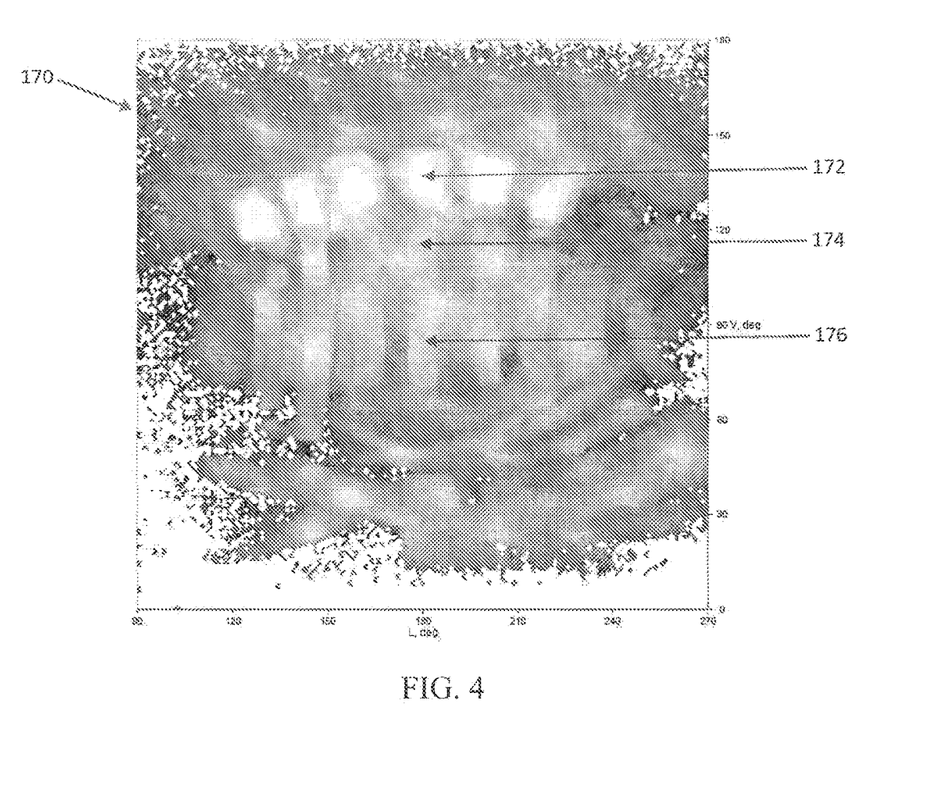
FIG. 4 shows a far field relative intensity pattern (Log Scale) resulting from the infrared light focused by the Fresnel focusing arrangement of FIG. 3A onto a passive infrared detector according to an embodiment of the disclosed subject matter.

Such distinction is illustrated by the far field relative intensity pattern resulting from the infrared light focused by the Fresnel focusing arrangement 164 of FIG. 3A onto the infrared detector 162. FIG. 4 shows an illustrative log scale far field relative intensity pattern 170 according to an embodiment of the disclosed subject matter. To create the image of FIG. 4, the Fresnel focusing arrangement 164 focuses the infrared radiation from the spaces being monitored onto the infrared detector 162, and the signal from the infrared detector 162 is processed to determine the strength of the received signals. The construction, arrangement, material and transparency of the Fresnel focusing arrangement 164 as described in greater detail below, can be used to create the far field relative intensity pattern of FIG. 4. The image of FIG. 4 illustrates at least three discrete regions created by the implementation of the illustrative Fresnel focusing arrangement 164. For the following discussion, three regions are provided, but embodiments are not limited thereto. In this or other embodiments, any number of discrete regions can be provided to target any specific infrared sensing range as required by the application.

The three regions are spatially located as shown in FIG. 4, and reflect three different infrared light gathering strengths of the illustrative Fresnel focusing arrangement 164 that create a level of pet immunity as disclosed herein. A first region 172, located by way of example at the top of the far field relative intensity pattern 170 of FIG. 4, enables detection in sensing distance ranges between 10 and 20 feet, and at greater heights at sensing distance ranges between 0 and 20 feet. An example of the mapping of the first region 172 to lenslets of the illustrative Fresnel focusing arrangement 164 is shown in greater detail in FIG. 5, and is described in greater detail below. The mapped regions are shown for illustration purposes, and not all regions are mapped in the illustration for clarity.

A second region, or cross-over zone 174, located by way of example at the center of the far field relative intensity pattern 170 of FIG. 4, enables pet immunity in the sensing ranges between 6 and 10 feet, in which a sensed image of a pet can be easily confused with an image of a person at the same or greater sensing distance. An example of the mapping of the second region 174 to lenslets of the illustrative Fresnel focusing arrangement 164 is shown in greater detail in FIG. 5, and is described in greater detail below. As shown in FIG. 4, the infrared light gathering strength of the illustrative Fresnel focusing arrangement 164 for the sensing ranges between 6 and 10 feet is less than the infrared light gathering strength of the illustrative Fresnel focusing arrangement 164 for the sensing ranges between 10 and 20 feet.

A third region 176, located by way of example at the bottom of the far field relative intensity pattern 170 of FIG. 4, enables detection in the sensing ranges between 0 and 6 feet. An example of the mapping of the third region 176 to lenslets of the illustrative Fresnel focusing arrangement 164 is shown in greater detail in FIG. 5, and is described in greater detail below. As shown in FIG. 4, the infrared light gathering strength of the illustrative Fresnel focusing arrangement 164 for the sensing ranges between 0 and 6 feet is less than the infrared light gathering strength of the illustrative Fresnel focusing arrangement 164 for the sensing ranges between 6 and 10 feet.

As noted above, the second region, or cross-over zone 174, enables pet immunity in the sensing ranges between 6 and 10 feet, in which a sensed image of a pet can be easily confused with an image of a person at the same or greater sensing distance. As previously described, Fresnel lens arrangements used in conventional passive infrared motion sensors have the characteristic that the size of the active area from which radiation is focused increases as a function of the separation distance from the detector. Therefore, it becomes more and more difficult to distinguish between the signal of a pet at a closer distance, from the signal of a person at a greater distance. At distances closer to the sensor, the width of the infrared beams are narrow and as such, a small pet will produce a signal similar in level to a person detected at a substantial distance away from the sensor. The Fresnel focusing arrangement 164 creates the weighted infrared sensing region corresponding to these distances closer to the sensor, in which the width of the infrared beams are narrow and in which a small pet will produce a signal similar in level to a person detected at a substantial distance away from the sensor. The Fresnel focusing arrangement 164 uses a lenslet region, an optically opaque region and a plurality of extruded cylindrical lenslets that extend across a portion of both the lenslet region and the optically opaque region such that signal detection in the infrared sensing ranges between 0 and 10 feet and specifically between 6 and 10 feet may be "weighted" when compared to a person detected at a substantial distance away from the sensor. The sensor may then easily distinguish between a pet within the second infrared sensing range and a person at any infrared sensing range.

The cross-over zone 174 is created as a weighted infrared sensing region by using at least a lenslet region, an optically opaque region and a plurality of extruded cylindrical lenslets that extend across a portion of both the lenslet region and the optically opaque region. To achieve multiple regions as illustrated in FIG. 4, the embodiment provides a Fresnel focusing arrangement 164 having multiple lenslets in which each lenslet includes a focusing element defining an infrared beam that collectively covers the protected area. The Fresnel focusing arrangement 164, shown in greater detail in FIG. 3A, creates the weighted regions using at least a lenslet region 182, a plurality of extruded cylindrical lenslets 184, and an optically opaque region 186.

Figure 3B:
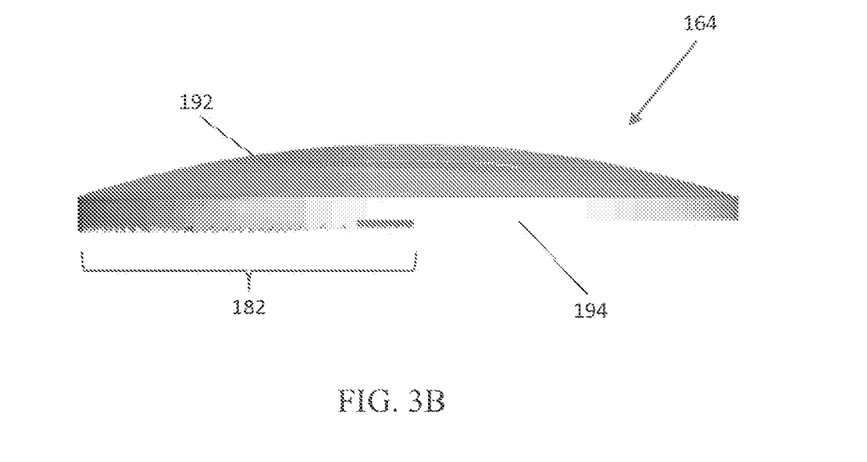
FIG. 3B is a right side elevational view of the Fresnel focusing arrangement of FIG. 3A according to an embodiment of the disclosed subject matter.
Figure 3C:
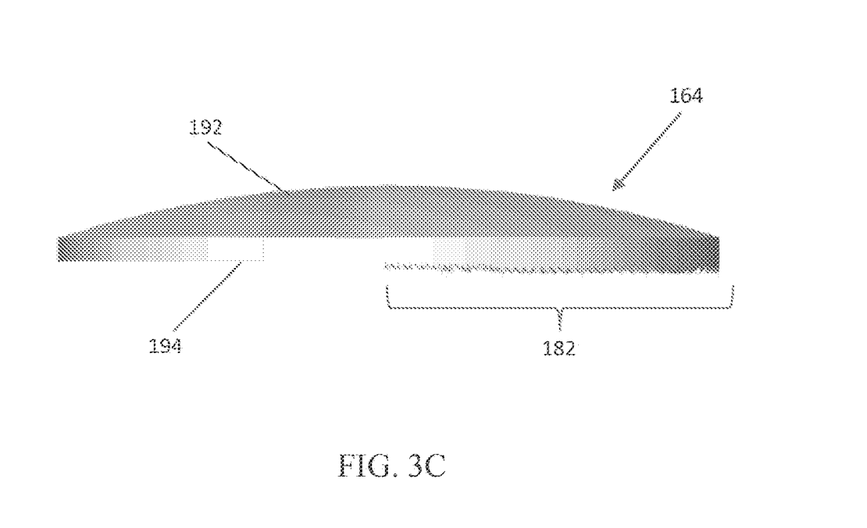
FIG. 3C is a left side elevational view of the Fresnel focusing arrangement of FIG. 3A according to an embodiment of the disclosed subject matter.

As shown in FIGS. 3A, 3B and 3C, the Fresnel focusing arrangement 164 is substantially circular and is constructed of any suitable material, and can be constructed having any desired thickness suitable for the application as known to those skilled in the art. The Fresnel focusing arrangement 164 includes a front, substantially smooth surface 192 having a slight curvature as shown in FIGS. 3B and 3C. The Fresnel focusing arrangement 164 further includes a rear surface 194 having disposed thereon at least the lenslet region 182, the plurality of extruded cylindrical lenslets 184, 186, 188 and the optically opaque region 190.

The optically opaque region 190 may be provided along a lower portion of the rear surface of the Fresnel focusing arrangement 164. The lenslet region 182 is provided along an upper portion of the rear surface of the Fresnel focusing arrangement 164, and includes a series of lenslets to target the infrared sensing distances of between 10 and 20 feet or otherwise furthest from the sensor, and at greater heights at sensing distance ranges between 0 and 20 feet. The lenslet region 182 includes any number and arrangement of lenslet elements to target the infrared sensing distances of between 10 and 20 feet or otherwise furthest from the sensor, and at greater heights at sensing distance ranges between 0 and 20 feet. The number and arrangement of the lenslet region 182 is presented as an example and embodiments are not limited thereto.

At least three extruded cylindrical lenslets 184, 186, 188 extend across a portion of both the lenslet region 182 and the optically opaque region 186 as shown in FIG. 3A, and are configured to give a weighted value to infrared sensing distances. For example, they may give weighted values to sensing distances between 0 and 10 feet, and specifically infrared sensing distances of between 6 and 10 feet, and at lower heights at sensing distance ranges between 0 and 10 feet. The number and arrangement of the extruded cylindrical lenslets 184, 186, 188 is presented as an example and embodiments are not limited thereto.

Figure 5:
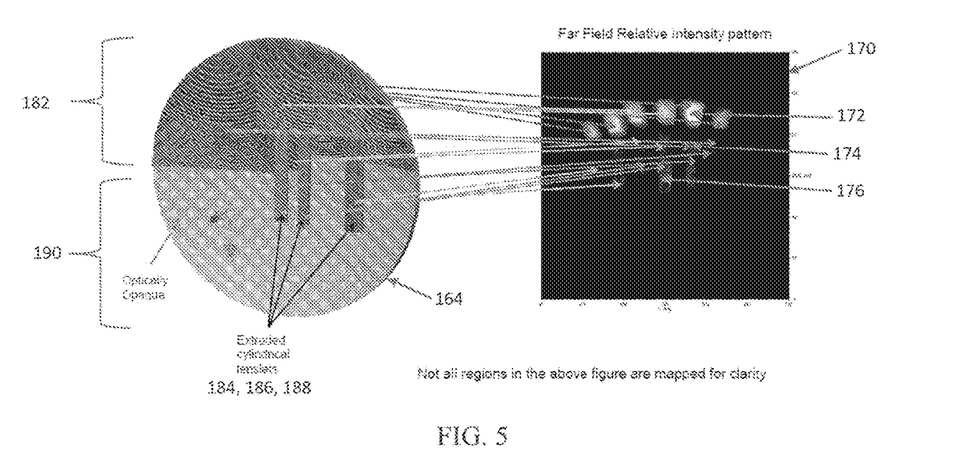
FIG. 5 shows an illustrative mapping between the Fresnel focusing arrangement of FIG. 3A and the far field relative intensity pattern of FIG. 4 according to an embodiment of the disclosed subject matter.

By providing the extruded cylindrical lenslets 184, 186, 188 across a portion of both the lenslet region 182 and the optically opaque region 186 as shown in FIG. 3A, the cross-over zone 174 is created. As shown in FIG. 5, the lenslet region 182 focuses infrared light onto the passive infrared detector in a manner that creates the first region 172, located by way of example at the top of the far field relative intensity pattern 170 of FIG. 4, and which enables detection in sensing distance ranges between 10 and 20 feet, and at greater heights at sensing distance ranges between 0 and 20 feet.

As further shown in FIG. 5, both the lenslet region 182 and the extruded cylindrical lenslets 184, 186, 188 focus infrared light onto the passive infrared detector in a manner that creates the second region, or cross-over zone 174, located by way of example at the center of the far field relative intensity pattern 170 of FIG. 4, and which enables pet immunity in the sensing ranges between 6 and 10 feet. As shown in FIG. 4, the infrared light gathering strength of the illustrative Fresnel focusing arrangement 164 for the sensing ranges between 6 and 10 feet is less than the infrared light gathering strength of the illustrative Fresnel focusing arrangement 164 for the sensing ranges between 10 and 20 feet. This serves to "weight" the second region such that the maximum signal of a pet within the range of interest, in this case, between 6 and 10 feet, is exceeded by the minimum signal of a person at any range, taking into consideration the range and height of sensing distances and the fact that the size of the active area from which radiation is focused increases as a function of the separation distance from the sensor.

Still further as shown in FIG. 5, the extruded cylindrical lenslets 184, 186, 188 focus infrared light onto the passive infrared detector in a manner that creates the third region 176, located, by way of example, at the bottom of the far field relative intensity pattern 170 of FIG. 4, and which enables detection in the sensing ranges between 0 and 6 feet. As shown in FIG. 4, the infrared light gathering strength of the illustrative Fresnel focusing arrangement 164 for the sensing ranges between 0 and 6 feet is less than the infrared light gathering strength of the illustrative Fresnel focusing arrangement 164 for the sensing ranges between 6 and 10 feet.

Figure 6:
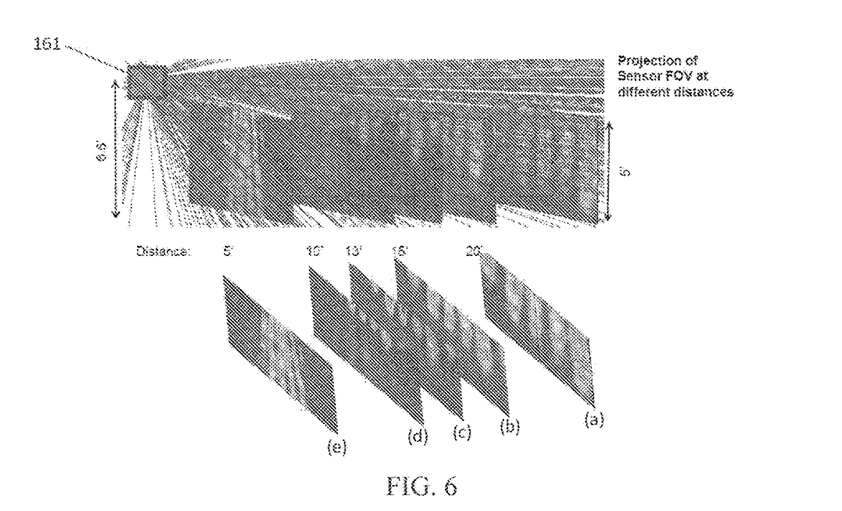
FIG. 6 shows an illustrative projection of a sensor field of view at different distances according to embodiments of the disclosed subject matter.

FIG. 6 is an illustrative projection of the sensor field of view illustrated at different distances in which the illustrative Fresnel focusing arrangement 164 is provided. In the example shown, the sensor 161 is located at a height of 6 feet 6 inches, and an angle of 51.4 degrees. A field of view of the sensor 161 is illustrated by projection lines extending from a distance of 0 feet to beyond a distance of 20 feet. Panels (a), (b), (c), (d) and (e) are extracted from the field of view to visualize the portions of a pet and person that become visible to the sensor 161 at distances of 5 feet, 10 feet, 13 feet, 15 feet and 20 feet, respectively, and each to a height of 5 feet using the Fresnel focusing arrangement 164. It can be seen from panels (a) and (b) of the first region at the infrared sensing distances of 15 and 20 feet, and from panel (e) of the third region at the infrared sensing distance of 5 feet, that the sensor 161 easily detects and distinguishes persons.

It can also be seen from panels (c) and (d) of the second region or cross-over zone at the infrared sensing distances of 10 and 13 feet, that the sensor 161 excludes detection of pets within this range, especially up to a height of three feet. Above three feet, it can also be seen from panels (c) and (d) of the second region or cross-over zone at the infrared sensing distances of 10 and 13 feet, that the sensor 161 sensor easily detects and distinguishes persons.

Figure 7:
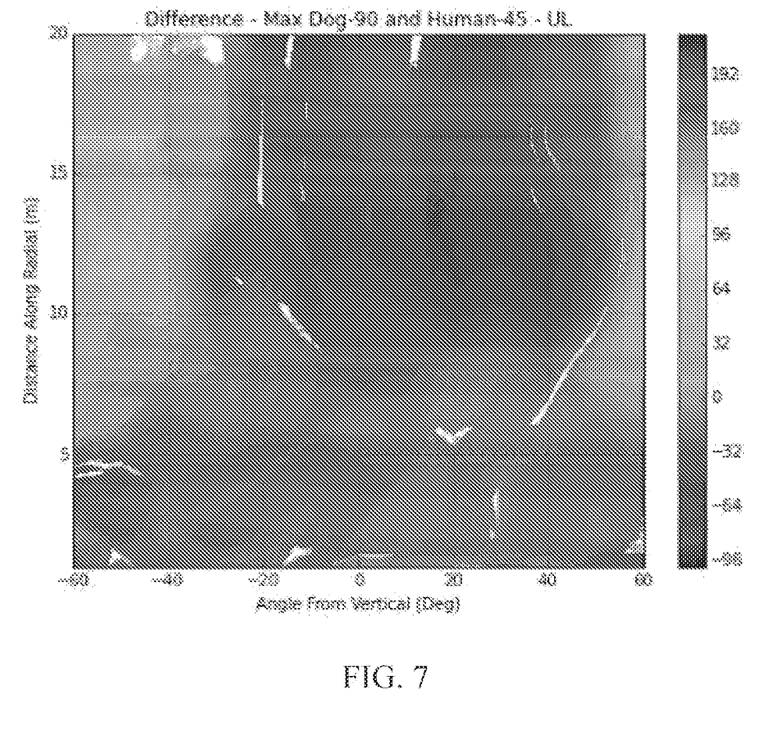
FIG. 7 shows an example plot of a signal difference between a person and pet according to an embodiment of the disclosed subject matter.

As noted above, some sensors may not distinguish a distance or height of an object, and typically operate based upon simple signal comparisons with threshold limits to identify targets. In contrast, some embodiments disclosed herein may allow for sensors to more accurately distinguish items having different distances and/or heights. FIG. 7 shows a plot of a signal difference between a person and pet according to an embodiment of the disclosed subject matter. As illustrated in FIG. 7, when performing a signal comparison in which the pet signal is subtracted from the person signal, the preferred outcome is a negative value indicated in blue. That is, it is desirable for the pet signal to exceed the person signal, resulting in a negative value. The color plot of FIG. 7 shows that the implementation of the sensor 161 and the illustrative Fresnel focusing arrangement 164 thereof results in a negative value at most distances, shown along the left vertical axis, and at most sensor positioning angles, shown along the horizontal axis.

Without the cross-over zone, a pet detected within this zone appears similar to a signal of a person detected at a greater distance. However, by providing the passive infrared motion detection sensor that includes a Fresnel focusing arrangement having one or more of an optically opaque region 186, lenslet region 182 and the extruded cylindrical lenslets 184, 186, 188 extending across a portion of both the lenslet region 182 and the optically opaque region 186, the three discrete regions are provided with different infrared light gathering strengths to improve features with respect to detection and distinction between persons and pets during pet immune mode operations. The three discrete regions of signal detection permit the signal detection of one or more regions to be "weighted", such that the detection of pet within a region can be weighted when compared to a person detected at a substantial distance away from the sensor. The sensor may then easily distinguish between a pet within the weighted region and a person at any other region. Further, only a single sensor and signal processing is required as the regions are created through the use of the single Fresnel focusing arrangement.

Sensors as disclosed herein may operate within a communication network, such as a conventional wireless network, and/or a sensor-specific network through which sensors may communicate with one another and/or with dedicated other devices. In some configurations one or more sensors may provide information to one or more other sensors, to a central controller, or to any other device capable of communicating on a network with the one or more sensors. A central controller may be general- or special-purpose. For example, one type of central controller is a home automation network, that collects and analyzes data from one or more sensors within the home. Another example of a central controller is a special-purpose controller that is dedicated to a subset of functions, such as a security controller that collects and analyzes sensor data primarily or exclusively as it relates to various security considerations for a location. A central controller may be located locally with respect to the sensors with which it communicates and from which it obtains sensor data, such as in the case where it is positioned within a home that includes a home automation and/or sensor network. Alternatively or in addition, a central controller as disclosed herein may be remote from the sensors, such as where the central controller is implemented as a cloud-based system that communicates with multiple sensors, which may be located at multiple locations and may be local or remote with respect to one another.

Figure 8:
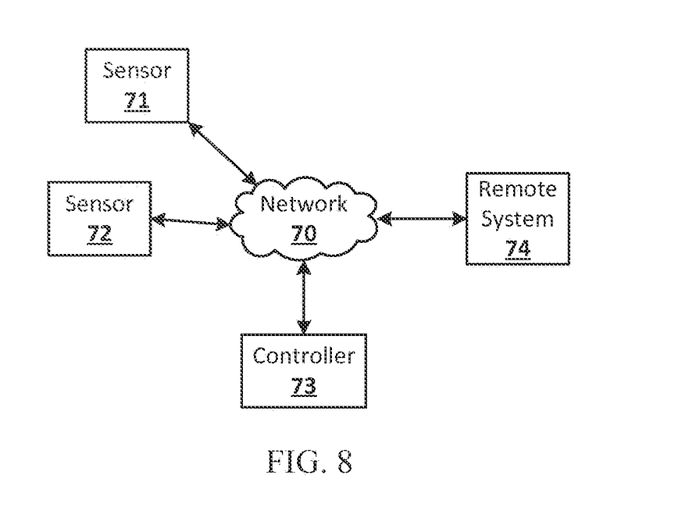
FIG. 8 shows an example of a sensor network as disclosed herein, which may be implemented over any suitable wired and/or wireless communication network.

FIG. 8 shows an example of a sensor network as disclosed herein, which may be implemented over any suitable wired and/or wireless communication networks. One or more sensors 71, 72 may communicate via a local network 70, such as a Wi-Fi or other suitable network, with each other and/or with a controller 73. The controller may be a general- or special-purpose computer. The controller may, for example, receive, aggregate, and/or analyze environmental information received from the sensors 71, 72. The sensors 71, 72 and the controller 73 may be located locally to one another, such as within a single dwelling, office space, building, room, or the like, or they may be remote from each other, such as where the controller 73 is implemented in a remote system 74 such as a cloud-based reporting and/or analysis system. Alternatively or in addition, sensors may communicate directly with a remote system 74. The remote system 74 may, for example, aggregate data from multiple locations, provide instruction, software updates, and/or aggregated data to a controller 73 and/or sensors 71, 72.

The sensor network shown in FIG. 8 may be an example of a smart-home environment. The depicted smart-home environment may include a structure, a house, office building, garage, mobile home, or the like. The devices of the smart home environment, such as the sensors 71, 72, the controller 73, and the network 70 may be integrated into a smart-home environment that does not include an entire structure, such as an apartment, condominium, or office space.

The smart home environment can control and/or be coupled to devices outside of the structure. For example, one or more of the sensors 71, 72 may be located outside the structure, for example, at one or more distances from the structure (e.g., sensors 71, 72 may be disposed outside the structure, at points along a land perimeter on which the structure is located, and the like. One or more of the devices in the smart home environment need not physically be within the structure. For example, the controller 73 which may receive input from the sensors 71, 72 may be located outside of the structure.

The structure of the smart-home environment may include a plurality of rooms, separated at least partly from each other via walls. The walls can include interior walls or exterior walls. Each room can further include a floor and a ceiling. Devices of the smart-home environment, such as the sensors 71, 72, may be mounted on, integrated with and/or supported by a wall, floor, or ceiling of the structure.

The smart-home environment including the sensor network shown in FIG. 8 may include a plurality of devices, including intelligent, multi-sensing, network-connected devices, that can integrate seamlessly with each other and/or with a central server or a cloud-computing system (e.g., controller 73 and/or remote system 74) to provide home-security and smart-home features. The smart-home environment may include one or more intelligent, multi-sensing, network-connected thermostats (e.g., "smart thermostats"), one or more intelligent, network-connected, multi-sensing hazard detection units (e.g., "smart hazard detectors"), and one or more intelligent, multi-sensing, network-connected entryway interface devices (e.g., "smart doorbells"). The smart hazard detectors, smart thermostats, and smart doorbells may be the sensors 71, 72 shown in FIG. 8.

In some embodiments, the smart-home environment of the sensor network shown in FIG. 8 may include one or more intelligent, multi-sensing, network-connected wall switches (e.g., "smart wall switches"), one or more intelligent, multi-sensing, network-connected wall plug interfaces (e.g., "smart wall plugs"). The smart wall switches and/or smart wall plugs may be or include one or more of the sensors 71, 72 shown in FIG. 8. A smart wall switch may detect ambient lighting conditions, and control a power and/or dim state of one or more lights. For example, a sensor such as sensors 71, 72, may detect ambient lighting conditions, and a device such as the controller 73 may control the power to one or more lights (not shown) in the smart-home environment. Smart wall switches may also control a power state or speed of a fan, such as a ceiling fan. For example, sensors 72, 72 may detect the power and/or speed of a fan, and the controller 73 may adjusting the power and/or speed of the fan, accordingly. Smart wall plugs may control supply of power to one or more wall plugs (e.g., such that power is not supplied to the plug if nobody is detected to be within the smart-home environment). For example, one of the smart wall plugs may controls supply of power to a lamp (not shown).

In embodiments of the disclosed subject matter, a smart-home environment may include one or more intelligent, multi-sensing, network-connected entry detectors (e.g., "smart entry detectors"). Such detectors may be or include one or more of the sensors 71, 72 shown in FIG. 8. The illustrated smart entry detectors (e.g., sensors 71, 72) may be disposed at one or more windows, doors, and other entry points of the smart-home environment for detecting when a window, door, or other entry point is opened, broken, breached, and/or compromised. The smart entry detectors may generate a corresponding signal to be provided to the controller 73 and/or the remote system 74 when a window or door is opened, closed, breached, and/or compromised. In some embodiments of the disclosed subject matter, the alarm system, which may be included with controller 73 and/or coupled to the network 70 may not arm unless all smart entry detectors (e.g., sensors 71, 72) indicate that all doors, windows, entryways, and the like are closed and/or that all smart entry detectors are armed.

In embodiments of the disclosed subject matter, a smart-home environment may include one or more intelligent, multi-sensing, network-connected intruder detectors (e.g., sensors 161). The sensors 161 may be disposed at one or more points of the smart-home environment for detecting and distinguishing an intruder. The sensors 161 may generate a corresponding signal to be provided to the controller 73 and/or the remote system 74 when an intruder is detected and distinguished. In some embodiments of the disclosed subject matter, the alarm system can provide at least two modes of operation. Where no pets are expected to be present within a detection range of the sensors, the user can operate the system without the creation and use of the weighted regions of the pet immune operation mode. Where pets are expected to be present within a detection range of the sensor, the user can operate the same system to implement the pet immune operation mode. Based upon the weighted focusing of infrared radiation, the system may detect and distinguish an intruder as either a person or pet, and automatically control lights and other alerts.

A user can interact with one or more of the network-connected smart devices (e.g., via the network 70). For example, a user can communicate with one or more of the network-connected smart devices using a computer (e.g., a desktop computer, laptop computer, tablet, or the like) or other portable electronic device (e.g., a smartphone, a tablet, a key FOB, and the like). A webpage or application can be configured to receive communications from the user and control the one or more of the network-connected smart devices based on the communications and/or to present information about the device's operation to the user. For example, the user can view can arm or disarm the security system of the home.

One or more users can control one or more of the network-connected smart devices in the smart-home environment using a network-connected computer or portable electronic device. In some examples, some or all of the users (e.g., individuals who live in the home) can register their mobile device and/or key FOBs with the smart-home environment (e.g., with the controller 73). Such registration can be made at a central server (e.g., the controller 73 and/or the remote system 74) to authenticate the user and/or the electronic device as being associated with the smart-home environment, and to provide permission to the user to use the electronic device to control the network-connected smart devices and the security system of the smart-home environment. A user can use their registered electronic device to remotely control the network-connected smart devices and security system of the smart-home environment, such as when the occupant is at work or on vacation. The user may also use their registered electronic device to control the network-connected smart devices when the user is located inside the smart-home environment.

A smart-home environment may include communication with devices outside of the smart-home environment but within a proximate geographical range of the home. For example, the smart-home environment may include an outdoor lighting system (not shown) that communicates information through the communication network 70 or directly to a central server or cloud-computing system (e.g., controller 73 and/or remote system 74) regarding detected movement and/or presence of people, animals, and any other objects and receives back commands for controlling the lighting accordingly.

Various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as hard drives, USB (universal serial bus) drives, or any other machine readable storage medium, such that when the computer program code is loaded into and executed by a computer, the computer becomes an apparatus for practicing embodiments of the disclosed subject matter. When implemented on a general-purpose microprocessor, the computer program code may configure the microprocessor to become a special-purpose device, such as by creation of specific logic circuits as specified by the instructions.

Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A system comprising:
    an infrared detector;
    a lens arrangement to focus infrared radiation from a target onto the infrared detector, the lens arrangement comprising:
        an optically opaque region,
        a lenslet region, and
        a plurality of extruded cylindrical lenslets, extending across a portion of both the lenslet region and the optically opaque region,
    wherein the lens arrangement forms a far field relative intensity pattern onto the infrared detector, the far field relative intensity pattern comprising at least a first region, a second region, and a third region, and
    wherein the focused infrared light from the second region is weighted with respect to the light in at least one of the first region and the second region by the lens arrangement, wherein the weighting is due to an infrared light gathering strength of the second region that corresponds to a sensing distance range of the detector.

2. The system of claim 1, wherein the first region corresponds to the sensing distance range of the detector selected from the group consisting of: between 10 and 20 feet, and between 0 and 20 feet.

3. The system of claim 1, wherein the second region corresponds to the sensing distance range of the detector of between 6 to 10 feet.

4. The system of claim 1, wherein the infrared light gathering strength of the lens arrangement for the second region is less than that for the first region.

5. The system of claim 1, wherein the third region corresponds to a sensing distance range of the detector of between 0 to 6 feet.

6. The system of claim 1, wherein the infrared light gathering strength of the lens arrangement for the third region is less than that for the second region.

7. The system of claim 1, wherein the detector distinguishes between a pet and a person using the second region, wherein a maximum signal generated by the detector based on the received infrared light from the pet at a range of interest is exceeded by a minimum signal generated by the detector based on the received infrared light from the person.

8. The system of claim 1, wherein a target in the weighted second region is distinguishable from a target in the first region.

9. A method comprising:
    focusing infrared radiation from by a target onto an infrared detector with a lens arrangement, the lens arrangement comprising: an optically opaque region, a lenslet region, and a plurality of extruded cylindrical lenslets that extend across a portion of both the lenslet region and the optically opaque region;
    forming, with the lens arrangement, a far field relative intensity pattern onto the infrared detector, the far field relative intensity pattern comprising at least a first region, a second region, and a third region; and
    weighting the focused infrared light from the second region with respect to the light in at least one of the first region and the second region by the lens arrangement, wherein the weighting is due to an infrared light gathering strength of the second region that corresponds to a sensing distance range of the detector.

10. The method of claim 9, wherein the first region corresponds to the sensing distance range of the detector selected from the group consisting of: between 10 and 20 feet, and between 0 and 20 feet.

11. The method of claim 9, wherein the second region corresponds to the sensing distance range of the detector of between 6 to 10 feet.

12. The method of claim 9, wherein the infrared light gathering strength of the lens arrangement for the second region is less than that for the first region.

13. The method of claim 9, wherein the third region corresponds to the sensing distance range of the detector of between 0 to 6 feet.

14. The method of claim 9, wherein the infrared light gathering strength of the lens arrangement for the third region is less than that for the second region.

15. The method of claim 9, wherein the detector distinguishes between a pet and a person using the second region, wherein a maximum signal generated by the detector based on the received infrared light from the pet at a range of interest is exceeded by a minimum signal generated based on the received infrared light by the detector from the person.

16. The method of claim 9, wherein a target in the weighted second region is distinguishable from a target in the first region.

* * * * *